US012416194B2

(12) United States Patent
Pellegrini

(10) Patent No.: US 12,416,194 B2
(45) Date of Patent: Sep. 16, 2025

(54) DOOR DRIVE FOR A DOOR OF A VEHICLE

(71) Applicant: Bode—Die Tür GmbH, Kassel (DE)

(72) Inventor: Andreas Pellegrini, Kassel (DE)

(73) Assignee: BODE—DIE TÜR GMBH, Kassel (DE)

( * ) Notice: Subject to any disclaimer, the term of this patent is extended or adjusted under 35 U.S.C. 154(b) by 0 days.

(21) Appl. No.: 18/322,055

(22) Filed: May 23, 2023

(65) Prior Publication Data

US 2023/0383578 A1 Nov. 30, 2023

(51) Int. Cl.

*E05F 15/632* (2015.01)
*E05B 81/06* (2014.01)
*E05B 81/30* (2014.01)
*E05B 81/38* (2014.01)

(52) U.S. Cl.

CPC ............ *E05F 15/632* (2015.01); *E05B 81/06* (2013.01); *E05B 81/30* (2013.01); *E05B 81/38* (2013.01); *E05Y 2201/72* (2013.01); *E05Y 2201/726* (2013.01); *E05Y 2900/51* (2013.01)

(58) Field of Classification Search

CPC ..... E05F 15/632; E05F 15/655; E05F 15/662; E05B 81/06; E05B 81/46; E05B 81/30; E05B 81/38

USPC .................................................... 74/527, 530

See application file for complete search history.

(56) References Cited

U.S. PATENT DOCUMENTS 1,139,905 A * 5/1915 Pitts ...................... E05F 15/632 49/362
3,250,350 A * 5/1966 Shimanckas ......... B63H 21/213 74/523
6,041,676 A * 3/2000 Bettenhausen ....... B65B 11/045 74/540
2003/0106457 A1* 6/2003 Inage ................. E05B 65/0882 105/341
2013/0298706 A1* 11/2013 Linnenkohl ................ B60J 5/06 74/89
2015/0054294 A1* 2/2015 Uno ........................ E05B 81/38 292/194
2016/0251888 A1* 9/2016 Makino ................. E05F 15/646 49/280
2019/0218848 A1* 7/2019 Fujita ..................... B61D 19/02

FOREIGN PATENT DOCUMENTS

| | | | |
|---|---|---|---|
| DE | 19735181 | C2 | 11/2001 |
| EP | 2500499 | A2 | 9/2012 |
| EP | 3792131 | A1 | 3/2021 |
| WO | 2015188210 | A1 | 12/2015 |

* cited by examiner

*Primary Examiner* — Gregory J Strimbu

(74) *Attorney, Agent, or Firm* — CANTOR COLBURN LLP

(57) ABSTRACT

A door drive for a door of a vehicle includes a rotation motor, a first torque transmitting device for transmitting a first torque, and a second torque transmitting device for transmitting a second torque. The door drive further includes a blocking device for blocking the first torque transmitting device, wherein the blocking device can be activated and deactivated, and the door drive has a component configured for activating and/or deactivating the blocking device. The door drive can be used to drive a door leaf, using the first torque transmitting device and to control a locking device using the second torque transmitting device. A drive power of the rotation motor is transmitted successively via the first and second torque transmitting devices with the aid of the blocking device.

9 Claims, 2 Drawing Sheets

DOOR DRIVE FOR A DOOR OF A VEHICLE

CROSS-REFERENCE TO RELATED APPLICATIONS

This application claims the benefit of German patent application 20 2022 102 869.9, filed on 24 May 2022, the disclosure of which is incorporated herein by reference in its entirety.

TECHNICAL FIELD

The present disclosure relates to a door drive for the door of a vehicle, e.g. of a rail vehicle, wherein the door drive comprises a drive unit comprising a rotation motor, a first torque transmitting device for transmitting a first torque and a second torque transmitting device for transmitting a second torque.

The disclosure also relates to a door with such a door drive and a vehicle with such a door drive.

BACKGROUND

Such a door drive is already known from EP 2 500 499 A2 and serves, in particular, for the motor-powered opening and closing and motor-powered locking and unlocking of a door. It is possible, by means of such a door drive, to transmit a drive torque, specifically, to convert in a simple and robust manner a rotary movement or drive power of the rotation motor into an unlocking movement, a door opening movement, a door closing movement and a locking movement in the required sequence.

A disadvantage of known door drives is that the door components cooperating with the door drive, such as toothed belts, dogs, guide rollers, locking levers and/or stops are often subjected to high loads.

SUMMARY

Therefore, the disclosure creates a door drive, a door with a door drive and a vehicle with a door drive that are improved with regard to this disadvantage.

The door drive according to the disclosure is characterized in that the door drive comprises a blocking device for blocking the first torque transmitting device. The blocking device can be activated and deactivated. The door drive further comprises an actuating member for activating and/or deactivating the blocking device.

The load on door components cooperating with the door drive, such as toothed belts, dogs, guide rollers, locking levers and/or stops, which often results from blocking one of the two torque transmitting devices in the prior art, can be avoided by means of the blocking device. The forces caused by the blocking device act, preferably exclusively, in the door drive. Therefore, the blocking device preferably is a drive-internal blocking device.

Within the context of this specification, a torque transmission means, in particular, a transmission of a rotary movement or of drive power. The drive power that can be transmitted by the first torque transmitting device and the second torque transmitting device can preferably be caused by one and the same rotation motor, which is preferably configured as an electric motor. The second torque that can be transmitted by the second torque transmitting device preferably is a reactive torque of the drive unit. "Reactive torque" means, in particular, a torque which, in the case of known, firmly mounted drive units, is supported by a support reaction, e.g. by means of a torque bracket.

In a simple embodiment, the drive unit may be gearless. In that case, the drive unit may be formed by the rotation motor.

The first torque transmitting device may include a wheel, e.g. a gear or toothed belt pulley, or be formed thereby.

In a simple embodiment, the first torque transmitting device may be non-rotatably connected to a motor shaft of the rotation motor.

The second torque transmitting device may include an actuating lever or a gear or toothed belt pulley, or be formed thereby.

The rotation motor may have a motor housing. The motor housing may be non-rotatably supported. Preferably, however, the motor housing is rotatable. The second torque transmitting device may be non-rotatably connected to the motor housing.

Preferably, a drive power of the rotation motor can be transmitted successively via the first torque transmitting device and the second torque transmitting device. In a particularly preferred embodiment, the drive unit is configured such that the transmission of the drive power of the rotation motor via the respectively desired torque transmitting device can be achieved by blocking the other torque transmitting device. In order for the drive power or complete drive power to be transmissible via the first or the second torque transmitting device, the respective other torque transmitting device preferably has to be blocked. Preferably, the sum of the powers transmitted via the first torque transmitting device and the second torque transmitting device always corresponds, at least approximately, to the drive power of the rotation motor.

The drive unit preferably comprises a gearing unit with at least one gearing.

The gearing unit may be combined with the rotation motor to form a gearing motor. The drive unit may be formed by the gearing motor. The gearing unit may include a drive side, on which a drive shaft is disposed which may be non-rotatably connected to the motor shaft of the rotation motor. The gearing unit may comprise an output side on which an output shaft is disposed. The first torque transmitting device may be non-rotatably connected to the output shaft of the gearing unit.

The gearing unit may comprise a gear case. The gear case may be adapted for being firmly fixed to the surroundings, e.g. a vehicle. The gearing unit may comprise a gearing with a drive shaft and an output shaft that extend parallel to or coaxially with each other. Additionally or alternatively, the gearing unit may comprise a bevel gearing. If the gearing unit comprises several gearings, they may have a common gear case.

In a simple embodiment, the gearing unit may comprise exactly one output side.

In a particularly preferred embodiment, the drive unit comprises a gearing unit with a drive side, a first output side and a second output side. If the gearing comprises an epicyclic gearing with planet gears mounted on a planet carrier and a ring gear, then a particularly compact construction can be obtained.

An output shaft, e.g. operatively connected to the planet carrier, may be arranged on the first output side, and an output gear, e.g. the ring gear, may be arranged on the second output side.

Preferably, the first torque transmitting device is arranged on the first output side, and the second torque transmitting device on the second output side. The first torque transmitting device may be non-rotatably connected to the output shaft, and the second torque transmitting device may be non-rotatably connected to the output gear.

The ring gear may be rotatably mounted in the gear case. The ring gear may be non-rotatably connected to the motor housing.

In one embodiment, the rotation motor is combined with the gearing unit, which comprises an epicyclic gearing and a bevel gearing, to form a gear motor.

If the actuating member is also arranged on the second output side, a particularly suitable capability of the block device to be activated and deactivated may result. Preferably, the actuating member is operatively connected to the second torque transmitting device. Preferably, the actuating member is arranged in a rotatable manner and achieves its actuating effect by means of this rotation, preferably by means of a control contour. This rotation may match the rotation of the second torque transmitting device with regard to the axis, direction and speed of rotation. The actuating member may be configured to be non-rotatable relative to the second torque transmitting device.

In a particularly preferred embodiment, the blocking device has a blocking member. Preferably, the blocking member can be displaced by means of the actuating member between the releasing position and the blocking position. In the releasing position of the blocking member, the blocking device is preferably deactivated and permits the transmission of the first torque by the first torque transmitting device. In the blocking position of the blocking member, the blocking device is preferably activated and prevents the transmission of the first torque by the first torque transmitting device, preferably by the blocking device blocking the rotary movement of the first torque transmitting device. At least in the region of the guide, the blocking member may be rod-shaped.

A robust blocking device may be created if the blocking device comprises a guide, preferably a linear guide, for the blocking member, and the blocking member can be, in particular translationally, displaced between the releasing position and the blocking position. The guide may be arranged on the gear case.

Preferably, the blocking member has a blocking head that, preferably positively, blocks the first torque transmitting device in the blocking position. The axis of rotation, about which the actuating member may be arranged in a rotatable manner, preferably extends parallel to the translational displacement direction of the blocking member.

If the blocking device comprises a spring, which acts on the blocking member and whose force acts against a displacement of the blocking member from the releasing position into the blocking position or vice versa, then the activation or deactivation of the blocking device may be simplified.

In a particularly advantageous embodiment, the blocking device can be activated and deactivated in a purely mechanical manner.

A capability of the blocking device of being mechanically activated and deactivated particularly reliably and precisely can be obtained if the blocking member has a contact region and the actuating member has an actuating region, wherein the actuating region preferably has a control contour with a ramp portion and a plateau portion, and the displacement of the blocking member from the releasing position into the blocking position—or vice versa—can be achieved by an, in particular sliding, contact of the contact region with the ramp portion.

In addition, a retention of the blocking member, particularly against the force of the spring and in the blocking position, can preferably be achieved by an, in particular temporarily sliding, contact of the contact region with the plateau portion.

Alternatively, the actuating region may be arranged on the blocking member, and the contact region on the actuating member. The contact region may include a sliding part.

Instead of the blocking device being capable of being activated and deactivated in a purely mechanical manner, the blocking device may be capable of being activated and deactivated electrically. For this purpose, the blocking member may be electromagnetically or electrically displaceable, for example, possibly by means of a lifting magnet or an electric drive. This may be controlled by sensor contact pairs, in which a single contact rotates along with the second torque transmitting device and the associated paired contact does not co-rotate.

The door according to the disclosure comprises a door drive according to the above description. In addition, it comprises at least one door leaf and a locking device. The door may be a sliding door or pivot sliding door. Preferably, the motor housing or the ring gear of the epicyclic gearing are not firmly clamped. Preferably the motor housing or the ring gear of the epicyclic gearing, and with it, the second torque transmitting device, can be rotated back and forth, preferably by less than 360 degrees and more than 5 degrees, and preferably by about 60 degrees.

The rotatability of the second torque transmitting device may be limited between an unlocked rotational position, which correlates with the unlocked position of the locking device, and a locked rotational position, which correlates with a locked position of the locking device, e.g. by stops of the door drive, e.g. of the gear case or the door, e.g. of the locking device.

Preferably, the locking device prevents in its locked position an opening of the at least one door leaf.

Preferably, the door comprises door components cooperating with the door drive, such as toothed belts, dogs, guide rollers, locking levers and/or stops.

Preferably, the at least one door leaf can be driven, e.g. displaced, by means of the first torque transmitting device, e.g. by means of a toothed belt.

Preferably, the locking device can be controlled, or brought into a locked position and an unlocked position, by means of the second torque transmitting device, e.g. by means of a toothed belt or an actuating lever.

A robust lock can be achieved if the locking device comprises two locking levers that can be brought into a locked position, in which they are in an over-center position and prevent the door leaf from being opened, and the locking levers can be brought into an unlocked position in which they enable the door leaf to be opened. Preferably, the locking device can be locked and unlocked by means of the second torque transmitting device. Preferably, the locking device is configured such that, in particular driven by the reactive torque of the drive unit, the locking levers can be reciprocated between their locked position and their unlocked position. Preferably, the door leaf can be locked over-center in its closed position by means of these two levers.

The door may comprise a drive carrier. The drive carrier may be displaceable between an open position and a closed position relative to the surroundings, e.g. the vehicle, e.g. by means of at least one guide and/or by means of at least one pivot lever. The at least one door leaf may be displaceable along the drive carrier for opening and closing the door. The door may be configured such that a displacement of the door leaf for opening the door is prevented in the closed position of the drive carrier, e.g. by means of a stop, and is possible in the open position of the drive carrier. In one embodiment, the locking levers in their over-center position prevent an opening of the door leaf by preventing a displacement of the drive carrier from the closed position into the open position.

In a particularly preferred embodiment, the door is configured such that the transmission of the drive power of the rotation motor via the respectively desired torque transmitting device can be achieved by blocking the other torque transmitting device.

Preferably, the door is configured such that, in the case of a closed, locked door, the blocking device is activated by means of the actuating member and the first torque transmitting device is blocked thereby.

Preferably, the door further is configured such that, due to this blocking action, a complete door opening drive power of the rotation motor can be transmitted via the second torque transmitting device, preferably without subjecting door components cooperating with the door drive, such as toothed belts, dogs, guide rollers, locking levers and/or stops, to loads.

Preferably, the door further is configured such that the second torque transmitting device thereupon rotates, preferably by less than 360 degrees and more than 5 degrees, and preferably by about 60 degrees, and the actuating member rotates along therewith due to its non-rotatable connection to the second torque transmitting device.

Preferably, the door, on the one hand, is thus unlocked by means of the second torque transmitting device and, on the other hand, the blocking device is deactivated by means of the actuating member.

Preferably, the door further is configured such that then, the complete door opening drive power of the rotation motor is transmitted via the first torque transmitting device and the door leaf opens. In this case, the second torque transmitting device may be blocked, e.g. by a stop.

Preferably, the door is additionally configured such that the rotation motor delivers no drive power when the door leaf is completely open, and is switched off, for example, until the door is to be closed again.

Preferably, the door further is configured such that, when the door leaf is open, a complete door closing drive power of the rotation motor is transmitted via the second torque transmitting device. In this case, the second torque transmitting device may be blocked or checked, e.g. by a stop, or by a friction to be overcome, which is greater compared with the friction to be overcome by the first torque transmitting device.

Preferably, the door further is configured such that, once the door leaf is closed, a complete door closing drive power of the rotation motor is transmitted via the second torque transmitting device. In this case, the first torque transmitting device may at first be blocked by door components cooperating with the door drive, such as toothed belts, dogs, guide rollers, locking levers and/or stops. The first torque transmitting device may at first be blocked, for example, by the closed door leaf abutting against a door seal.

Preferably, the door further is configured such that the second torque transmitting device rotates back thereupon, and the actuating member with it. Preferably, the door, on the one hand, is thus locked by means of the second torque transmitting device and, on the other hand, the blocking device is activated by means of the actuating member, so that the door components cooperating with the door drive are relieved from generating the blocking effect, and the first torque transmitting device is blocked by the blocking device.

Thus, it can be accomplished that the door components cooperating with the door drive are at least almost relieved from generating the blocking effect of the first torque transmitting device.

Preferably, the door is further configured such that the rotation motor delivers no drive power when the door leaf is completely locked, and is switched off, for example, until the door is to be opened again.

In a particularly preferred embodiment, the door is configured such that, when and as long as the door is locked, the first torque transmitting device is blocked exclusively by means of the blocking device. A driving of the door leaf in the opening direction in spite of an existing lock and a load on the lock due to blocking forces connected therewith may thus be avoided. This may extend the life of the locking device and eliminate possible noise connected with these loads. Preferably, before the door leaf is driven in the opening direction, the locking device is always unlocked by the first torque transmitting device being blocked by the blocking device until the unlocking has taken place. Preferably, the actuating member is arranged such that it activates the blocking device when and as long as the second torque transmitting device is rotated from its unlocked rotational position. Preferably, the first torque transmitting device is blocked by the blocking device when the second torque transmitting device is being actuated, or during a rotation of the second torque transmitting device. Preferably, identical components of the rotation motor or of the door drive rotate in a first direction of rotation when delivering door opening drive power, and in the second direction of rotation opposite thereto when delivering door closing drive power. The term "door closing drive power" means the power of the rotation motor that the latter delivers for closing the door leaf and/or for locking the door. The term "door opening drive power" means the power of the rotation motor that the latter delivers for opening the door leaf and/or for unlocking the door.

The vehicle according to the disclosure comprises a door drive according to the above description. The vehicle may be a local public transport vehicle. The vehicle may be a rail vehicle.

The features of the door drive, the door and the vehicle may be combined with one another.

A conjunction "and/or" used hereinafter, which is situated between two features, is always to be interpreted such that, in a first embodiment of the subject matter, only the first feature may be provided, in a second embodiment, only the second feature may be provided, and in a third embodiment, both the first and the second feature may be provided.

BRIEF DESCRIPTION OF THE DRAWINGS

The disclosure is explained below in more detail with reference to an exemplary embodiment. The Figures schematically show.

DETAILED DESCRIPTION OF THE DRAWINGS

Figure 1:
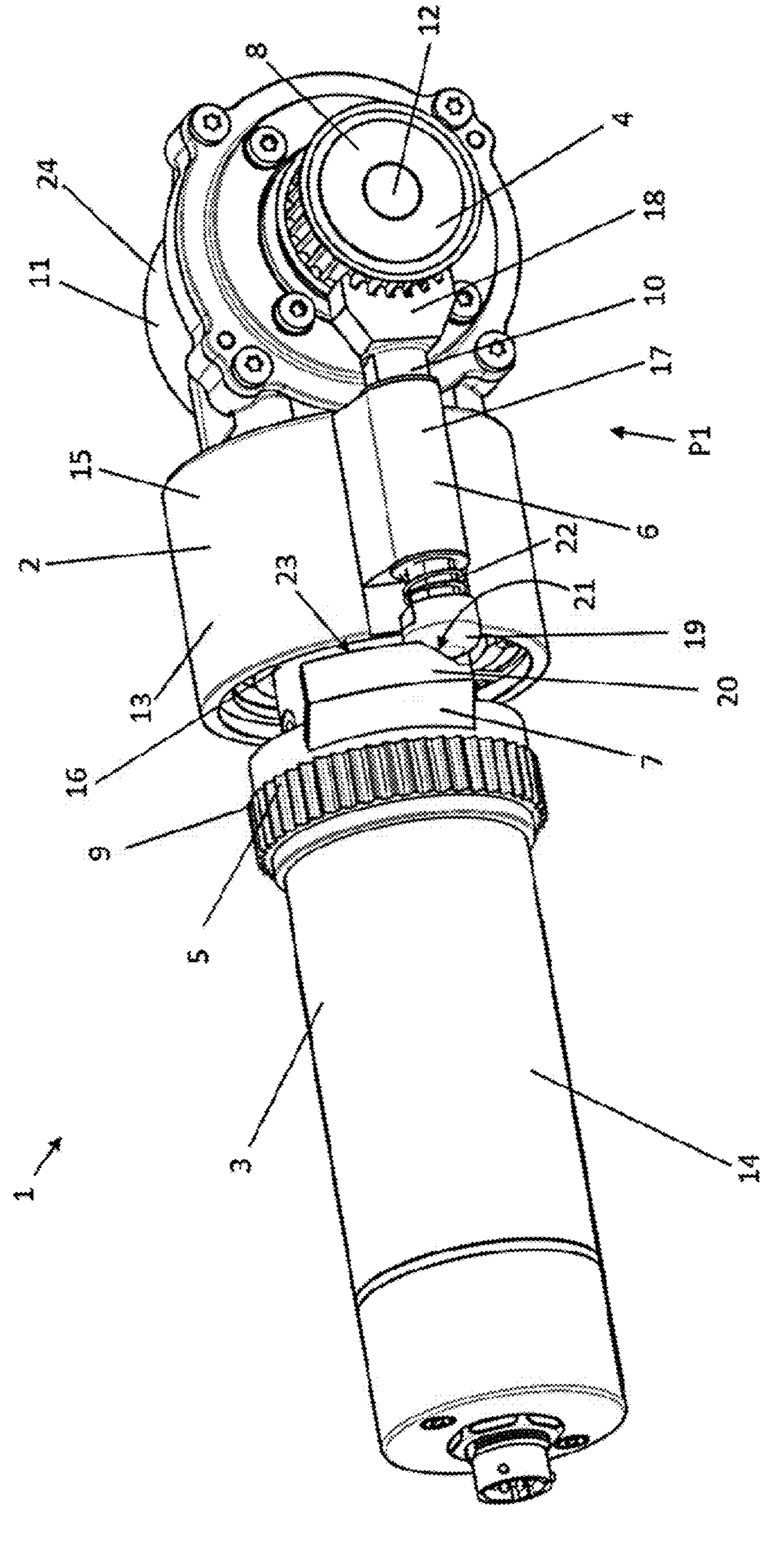
FIG. 1 shows a perspective view of an exemplary embodiment of a door drive with a deactivated blocking device.

As FIG. 1 shows, the exemplary embodiment of the drive unit 1 for the door of a vehicle shown in the drawings comprises a drive unit 2 comprising a rotation motor 3, a first torque transmitting device 4 for transmitting a first torque and a second torque transmitting device 5 for transmitting a second torque.

The door drive comprises a blocking device 6 for blocking the first torque transmitting device 4. The blocking device 6 can be activated and deactivated. For this purpose, the door drive 1 comprises an actuating member 7. The blocking device 6 is a drive-internal blocking device.

In the depicted exemplary embodiment, the first and second torque transmitting device 4, 5 are each formed by a toothed belt pulley. An actuating lever as a second torque transmitting device 5 would also be possible, for example.

A drive power of the electric rotation motor 3 can be transmitted successively via the first torque transmitting device 4 and the second torque transmitting device 5. The transmission of the drive power of the rotation motor via the respectively desired torque transmitting device 4, 5 can be achieved by blocking the other torque transmitting device 4, 5.

The drive unit 1 comprises a gearing unit 11 with two gearings, i.e. an epicyclic gearing 15 and a bevel gearing 24, which are combined with a rotation motor 3 to form a gear motor. Depending on the assembly situation, the bevel gearing may also be omitted. The common gear case 13 of the two gearings can be firmly fixed to a vehicle. The gearing unit 11 has a drive side, a first output side 8 and a second output side 9. The first torque transmitting device 4 is arranged on the first output side 8, and the second torque transmitting device 5 is arranged on the second output side 9. An output shaft 12 is arranged on the first output side 8, e.g. operatively connected to the planet carrier of the epicyclic gearing, and the ring gear 16 of the epicyclic gearing rotatably mounted in the gear case 13 is arranged on the second output side 9.

The actuating member 7 is also arranged on the second output side 9 and operatively connected in this manner to the second torque transmitting device 5.

The motor housing 14 of the rotation motor 3 is not firmly clamped but, together with the ring gear 16 and the second torque transmitting device 5, can be rotated back and forth by about 60 degrees.

Figure 2:
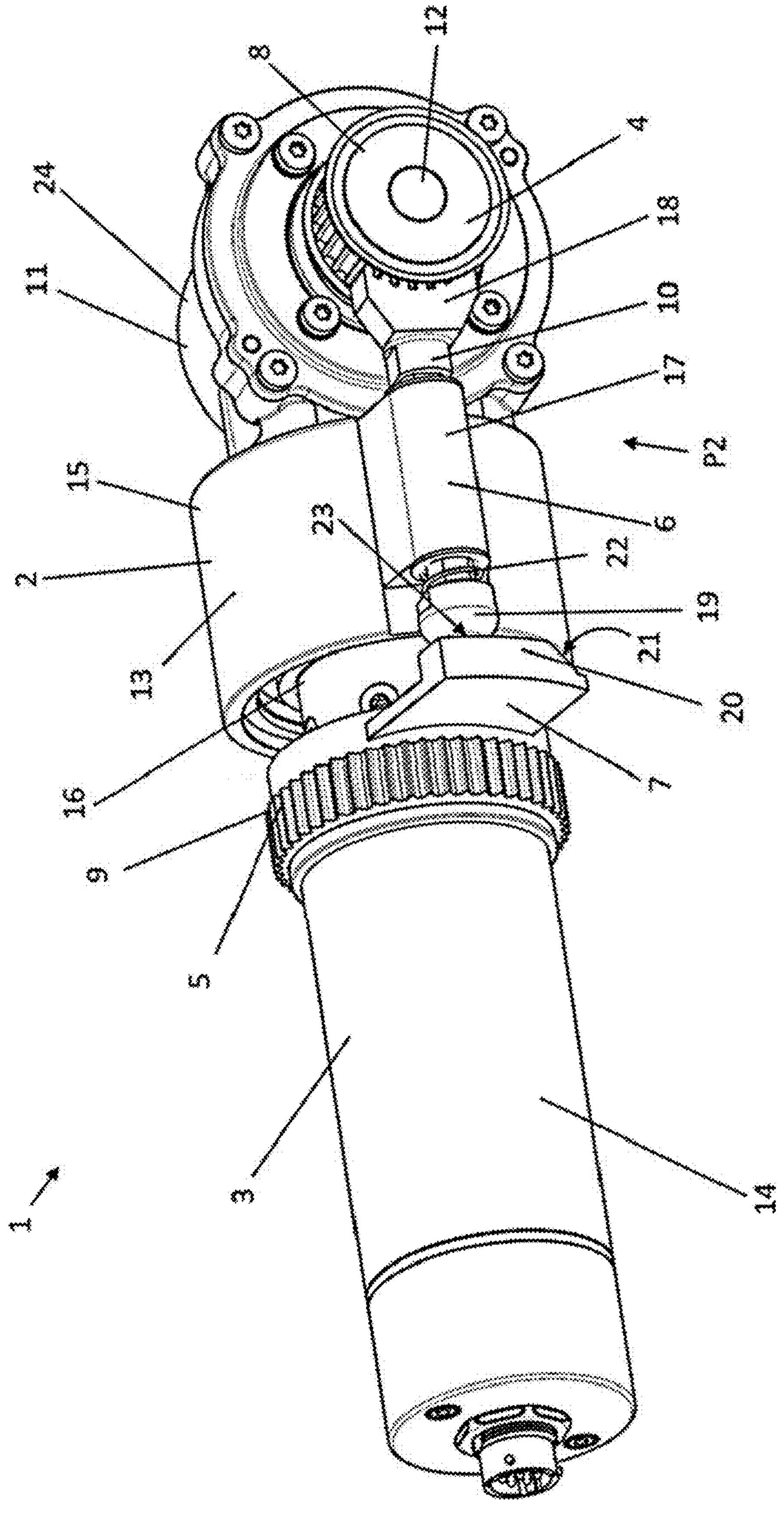
FIG. 2 shows a view as in FIG. 1, but with an activated blocking device.

As FIGS. 1 and 2 show, the blocking device 6, which can be mechanically activated and deactivated, has a rod-shaped blocking member 10 which, guided by a linear guide 17 arranged on the gear case 13, can be translationally displaced between a releasing position P1 and a blocking position P2 by means of the actuating member 7. In the blocking position P2 shown in FIG. 2, the blocking device 6 blocks the rotary movement of the first torque transmitting device 4, whereby the entire drive power of the rotation motor 3 is transmitted via the second torque transmitting device 5.

The blocking member 10 has a blocking head 18 for positively blocking the first torque transmitting device 4.

The blocking device 6 comprises a spring 22, which acts on the blocking member 10 and whose force acts against a displacement of the blocking member 10 from the releasing position P1 into the blocking position P2.

The blocking member 10 has a contact region 19, and the actuating member 7 has an actuating region 20, which has a control contour with a ramp portion 21 and a plateau portion 23. The displacement of the blocking member 10 from the releasing position P1 into the blocking position P2 can be attained by a sliding contact of the contact region 19 with the ramp portion 21 during the rotation of the actuating member 7.

As FIG. 2 shows, a retention of the blocking member 10 against the force of the spring 22 and in the blocking position P2 can additionally be achieved by a contact of the contact region 19 with the plateau portion 23.

The invention claimed is:

1. A door drive for a door of a vehicle, wherein the door drive has a drive unit, the door drive comprises:
- a rotation motor,
- a first torque transmitting device configured for transmitting a first torque, and
- a second torque transmitting device for controlling a locking device of the door and configured for transmitting a second torque,
- wherein the second torque transmitting device is non-rotatably connected to a motor housing and the second torque is configured to be transmitted by the second torque transmitting device and is a reactive torque of the drive unit, wherein a drive power of the rotation motor is successively transmitted by the first torque transmitting device and the second torque transmitting device,
- the door drive comprises a blocking device for blocking the first torque transmitting device, wherein the blocking device is configured to be activated and deactivated, and the door drive comprises an actuating member for activating the blocking device, and
- wherein the actuating member is operatively connected to the second torque transmitting device by being configured to be non-rotatable relative to the second torque transmitting device and the blocking device is a drive-internal blocking device and is configured to be activated and deactivated in a mechanical manner.

2. The door drive according to claim 1, wherein the drive unit comprises a gearing unit with
- a drive side,
- a first output side, and
- a second output side,
- and the first torque transmitting device is arranged on the first output side, and the second torque transmitting device is arranged on the second output side.

3. The door drive according to claim 2, wherein the gearing unit includes an epicyclic gearing with a ring gear and the second torque transmitting device is non-rotatably connected to the ring gear.

4. The door drive according to claim 1, wherein the blocking device has a blocking member which is configured to be displaced by the actuating member from a releasing position, in which the blocking device is deactivated, into a blocking position, in which the blocking device is activated.

5. The door drive according to claim 4, wherein the blocking device comprises a guide for the blocking member, and the blocking member is configured to be translationally displaced between the releasing position and the blocking position and has a blocking head that positively blocks the first torque transmitting device in the blocking position.

6. The door drive according to claim 4, wherein the blocking member has a contact region and the actuating member has an actuating region, wherein the actuating region has a control contour with a ramp portion and a plateau portion, and the displacement of the blocking member from the releasing position into the blocking position is configured to be achieved by a contact of the contact region with the ramp portion, and a retention of the blocking member in the blocking position is configured to be achieved by a contact of the contact region with the plateau portion.

7. The door drive according to claim 4, wherein the blocking device comprises a spring which acts on the blocking member and has a force that acts against a displacement of the blocking member from the releasing position into the blocking position.

8. A vehicle having a door, wherein the door has a door drive, wherein the door drive has a drive unit, the door drive comprises:

a rotation motor, a first torque transmitting device configured for transmitting a first torque, and a second torque transmitting device for controlling a locking device of the door and configured for transmitting a second torque, wherein the second torque transmitting device is non-rotatably connected to a motor housing and the second torque is configured to be transmitted by the second torque transmitting device and is a reactive torque of the drive unit, wherein a drive power of the rotation motor is successively transmitted by the first torque transmitting device and the second torque transmitting device, the door drive comprises a blocking device for blocking the first torque transmitting device, wherein the blocking device is configured to be activated and deactivated, and the door drive comprises an actuating member for activating the blocking device, and wherein the actuating member is operatively connected to the second torque transmitting device by being configured to be non-rotatable relative to the second torque transmitting device and the blocking device is a drive-internal blocking device and is configured to be activated and deactivated in a mechanical manner.

9. A door of a vehicle, the door having a door drive, wherein the door drive has a drive unit, the door drive comprises:

a rotation motor, a first torque transmitting device configured for transmitting a first torque, and a second torque transmitting device for controlling a locking device of the door and configured for transmitting a second torque, wherein the second torque transmitting device is non-rotatably connected to a motor housing and the second torque is configured to be transmitted by the second torque transmitting device and is a reactive torque of the drive unit, wherein a drive power of the rotation motor is successively transmitted by the first torque transmitting device and the second torque transmitting device, the door drive comprises a blocking device for blocking the first torque transmitting device, wherein the blocking device is configured to be activated and deactivated, and the door drive comprises an actuating member for activating the blocking device, and wherein the actuating member is operatively connected to the second torque transmitting device by being configured to be non-rotatable relative to the second torque transmitting device and the blocking device is a drive-internal blocking device and is configured to be activated and deactivated in a mechanical manner wherein the door comprises at least one door leaf.

* * * * *